Jan. 16, 1923.

G. H. KNEBUSCH.
RIVET SET.
FILED DEC. 22, 1919.

1,442,223.

Inventor.
George H. Knebusch
By Brockett & Hyde
Attys.

Patented Jan. 16, 1923.

1,442,223

UNITED STATES PATENT OFFICE.

GEORGE H. KNEBUSCH, OF CLEVELAND, OHIO, ASSIGNOR TO THE CLEVELAND STEEL TOOL COMPANY, OF CLEVELAND, OHIO, A CORPORATION OF OHIO.

RIVET SET.

Application filed December 22, 1919. Serial No. 346,448.

*To all whom it may concern:*

Be it known that I, GEORGE H. KNEBUSCH, a citizen of the United States, residing at Cleveland, in the county of Cuyahoga and State of Ohio, have invented certain new and useful Improvements in Rivet Sets, of which the following is a specification.

This invention relates to rivet sets.

The object of the invention is to provide an improved rivet set so constructed as to reduce the liability of the head snapping off from the shank; which is of simple construction and can be easily assembled; and to improve the construction so that the rivet set is to all intents and purposes a rigid solid member although constructed of several pieces.

Further objects of the invention are in part obvious and in part will appear more in detail hereinafter.

The invention comprises the construction and arrangement of parts hereinafter described and claimed.

Figure 1:
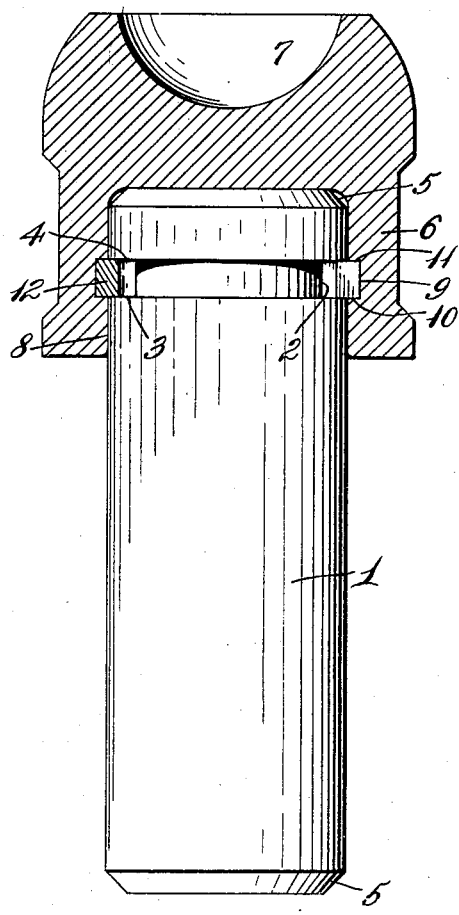
Figure 2:
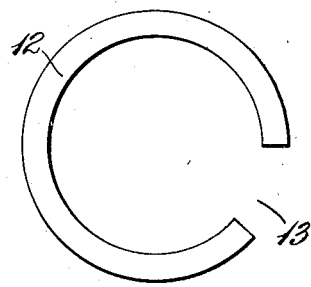

In the drawings, Fig. 1 represents a longitudinal sectional elevation of one form of rivet set embodying the invention; and Fig. 2 is a plan view of a securing ring.

The ordinary rivet set comprises a shank adapted for insertion into or connection to the riveting hammer or tool, said shank being provided with a head suitably formed to shape the rivet head. These sets are usually formed of expensive tool steel, in the tempering of which slight cracks may be developed or internal stresses or strains may be set up so that for these or other reasons use of the set frequently causes the head to snap off from the shank. Frequently this breakage is due to the fact that blows are imparted to the rivet at an angle so that the force is not in line with the axis of the set, and the angular strain breaks the shank transversely where it joins the head.

I have found from experience that the liability of the head snapping off from the shank may be greatly reduced by making the two parts separate and providing proper means for connecting them together so as to act as a practically rigid or integral member. This arrangement also enables the head to be made of more expensive tool steel and the shank of less expensive material if desired.

Referring now to the drawings the rivet set illustrated comprises a substantially cylindrical shank 1 which is provided near one end with an annular groove or channel 2 which is rectangular in cross section in a transverse plane through the axis of the shaft, as shown in Fig. 1, to provide square shoulders 3, 4. Either or both of the ends of the shaft may be beveled off, as indicated at 5, for convenience of manufacture, although this is not essential.

To the shank is secured a head 6 provided with the customary forming cavity 7, the opposite end of said head being provided with a cylindrical opening 8 to receive the shank, which fits said opening closely with practically no play therein. In the cylindrical opening of the head at a point approximately midway of the depth thereof, as shown in the drawings, is an annular groove or channel 9 of form similar to the channel 2, so as to provide square shoulders or abutments 10, 11, which align or are in registration with the similar square shoulders 3, 4 of the channel in the shank. When the head and shank are assembled the channels 2 and 9 lie directly opposite each other as shown in Fig. 1.

12 indicates a securing ring, which is rectangular in cross section and is provided with a fairly wide gap 13. This ring is made of resilient metal with a normal tendency to expand to a size sufficient to fill the channel 9 in the head of the rivet set.

In assembling the parts the ring 12 is inserted into the groove 3 of the shank, which is deep enough to receive said ring when compressed without any portion of said ring extending beyond the external surface of the shank. The shank is then inserted into the cylindrical opening of the head and as soon as the parts are pushed home ring 12 expands outwardly into the channel 9 of the head. This channel is shallow, having approximately half the depth of the ring. Consequently in the final position of the parts the ring lies partly in channel 2 and partly in channel 9 and engages the square shoulders 3, 4 and 10, 11 of both parts.

In the assembled relation the shank closely fits the head so that there is no lateral play, and as the end of the shank abuts the bottom of the cylindrical opening of the head said abutment and the ring 12 prevent longitudinal play. The parts therefore act as though integral. They are also permanently connected because it is impossible in this arrangement to compress the spring ring and detach the parts. The close fit of the spring ring in its seat and the interengagement of its transversely extending abutment surfaces with the aligned abutments of the shank and head enables shock to be transmitted through the ring from head to shank and vice versa, both during impact of the tool with the work and in the opposite direction on rebound.

This arrangement is found to reduce the liability of the head snapping off from the shank. Indeed, experience shows that the life of the rivet set is very materially increased. This may possibly be due to the fact that the strain of angular or glancing blows is not concentrated at the junction of the head and shank but is distributed over some length of shank.

What I claim is:

1. A rivet set, comprising a head provided with a cylindrical opening, a shank having a cylindrical portion entering said opening and at its end abutting the bottom of said opening, said shank and the wall of said opening having annular grooves provided with abrupt shoulders forming transversely extending abutments, and a resilient metal ring having a normal tendency to expand and lying in the annular grooves of said head and shank, said ring when assembled in the rivet set having transversely extending abutment surfaces engaging the aligned abutments of said head and shank and transmitting shock both during impact and rebound.

2. A rivet set, comprising a head provided with a cylindrical opening, a shank having a cylindrical portion entering said opening and at its end abutting the bottom of said opening, said shank and the wall of said opening having annular grooves provided with abrupt shoulders forming transversely extending abutments, and a resilient metal ring having a normal tendency to expand and lying in the annular grooves of said head and shank, said ring when assembled in the rivet set having transversely extending abutment surfaces engaging the aligned abutments of said head and shank and transmitting shock both during impact and rebound, said annular grooves in the shank and wall of said opening being located approximately midway of the depth of said opening and near the end of said shank.

In testimony whereof I affix my signature.

GEORGE H. KNEBUSCH.